United States Patent
Serdarevic

(10) Patent No.: US 9,742,281 B2
(45) Date of Patent: Aug. 22, 2017

(54) INDUCTIVE BUCK-BOOST-CONVERTER AND METHOD FOR DRIVING AN INDUCTIVE BUCK-BOOST-CONVERTER

(71) Applicant: ams AG, Unterpremstätten (AT)

(72) Inventor: Emir Serdarevic, Feldkirchen (AT)

(73) Assignee: AMS AG, Unterpremstaetten (AT)

( * ) Notice: Subject to any disclaimer, the term of this patent is extended or adjusted under 35 U.S.C. 154(b) by 33 days.

(21) Appl. No.: 14/341,687

(22) Filed: Jul. 25, 2014

(65) Prior Publication Data

US 2015/0042305 A1  Feb. 12, 2015

(30) Foreign Application Priority Data

Aug. 6, 2013 (EP) ..................... 13179443

(51) Int. Cl.
*H02M 3/158* (2006.01)
(52) U.S. Cl.
CPC ......... *H02M 3/1582* (2013.01); *H02M 3/158* (2013.01)
(58) Field of Classification Search
CPC ............................. H02M 3/158; H02M 3/1582
USPC ....................................................... 323/282
See application file for complete search history.

(56) References Cited

U.S. PATENT DOCUMENTS

| | | | |
|---|---|---|---|
| 2009/0102441 A1 | 4/2009 | de Cremoux et al. | |
| 2011/0169466 A1 | 7/2011 | Kuan et al. | |
| 2012/0206125 A1* | 8/2012 | Apriletti | H02M 3/155 323/351 |
| 2012/0229110 A1 | 9/2012 | Huang et al. | |
| 2013/0119957 A1 | 5/2013 | Kung | |

OTHER PUBLICATIONS

NTUEE Electronics-LHLu MOSFETS, http://cc.ee.ntu.edu.tw/~lhlu/eecourses/Electronics1/Electronics_Ch5.pdf, published on Mar. 16, 2012 courtesy of https://archive.org/web/.*

(Continued)

*Primary Examiner* — Fred E Finch, III
*Assistant Examiner* — Rafael O De Leon Domenech
(74) *Attorney, Agent, or Firm* — McDermott Will & Emery LLP

(57) ABSTRACT

In one embodiment an Inductive buck-boost-converter has an input (In) to which an input voltage (Vin) is supplied, an output (Out) at which an output voltage (Vout) is provided as a function of the input voltage (Vin), an inductor (L) having a first and a second terminal (Lx1, Lx2), a first switch (A) which switchably connects the inductor's (L) first terminal (Lx1) to the input (In), a second switch (B) which switchably connects the inductor's (L) first terminal (Lx1) to a ground potential terminal (10), a third switch (C) which switchably connects the inductor's (L) second terminal (Lx2) to the ground potential terminal (10), a fourth switch (D) which switchably connects the inductor's (L) second terminal (Lx2) to the output (Out), and a control unit (CTL) coupled to respective control inputs of first, second, third and fourth switches (A, B, C, D). Therein the converter is operated in three phases (1, 2, 3) by the control unit (CTL). In one of these three phases a transistor realizing the fourth switch (D) is driven in its saturation region by the control unit (CTL).

7 Claims, 3 Drawing Sheets

(56) References Cited

OTHER PUBLICATIONS

"AS1331 300mA Buck-Boost Synchronous DC/DC Converters Datasheet," ams AG, www.austriamicrosystems.com/DC-DC_Buck-Boost/AS1331 <http://www.austriamicrosystems.com/DC-DC_Buck-Boost/AS1331>, Revision 1.04, pp. 1-16-16-16.

"LTC3531/LTC3531-1.3/LTC3531-3 200mA Buck-Boost Synchronous DC/DC Converters Datasheet," Linear Technology Corporation, <http://www.linear.com/product/LTC3531>, pp. 1-16.

* cited by examiner

FIG 1
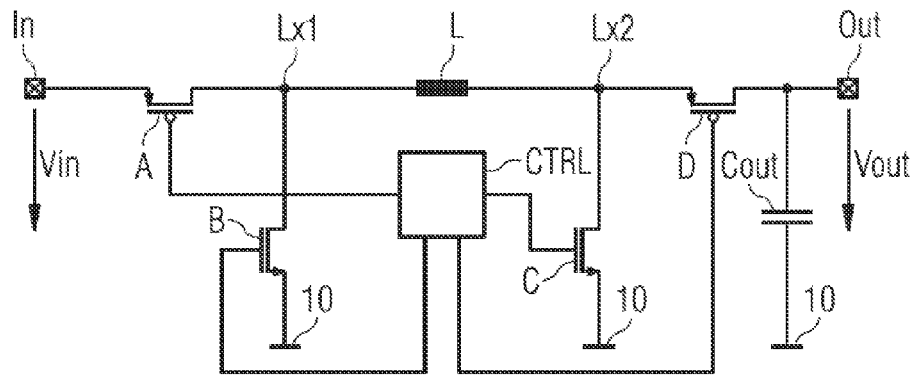
FIG 2
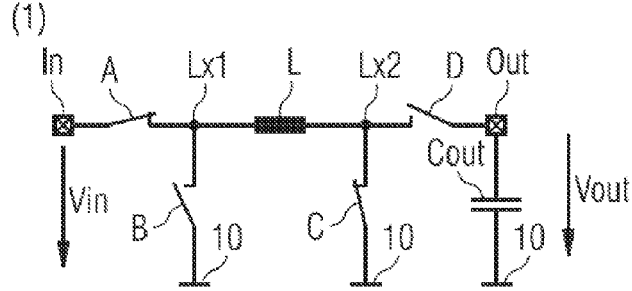
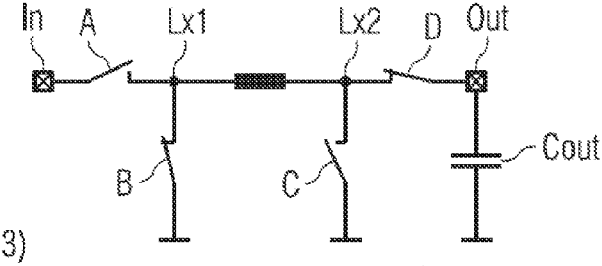
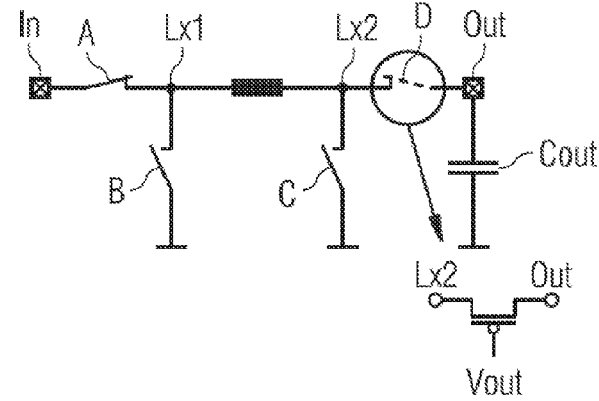

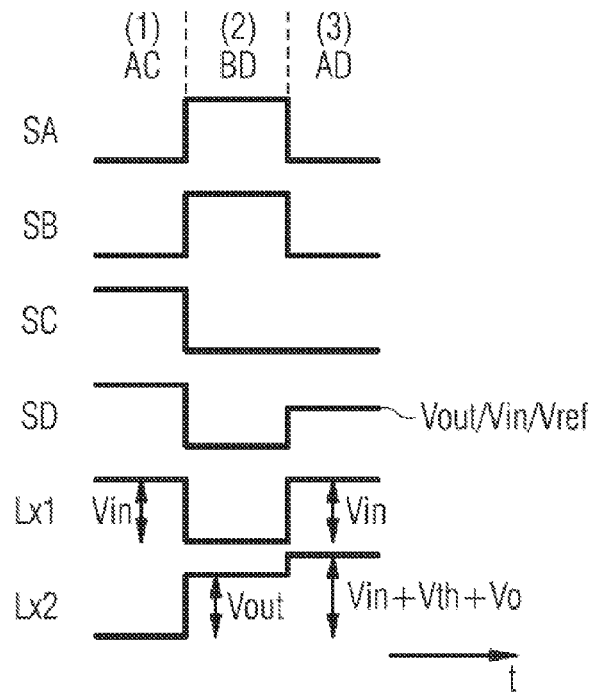
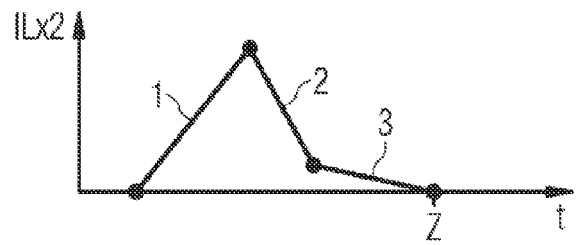
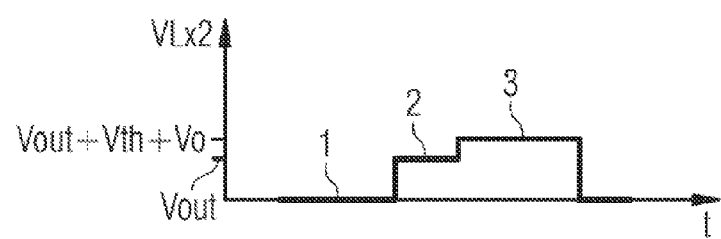

INDUCTIVE BUCK-BOOST-CONVERTER AND METHOD FOR DRIVING AN INDUCTIVE BUCK-BOOST-CONVERTER

CROSS-REFERENCE TO RELATED APPLICATION

This application claims the benefit of European Patent Application No. 13179443.0, filed on Aug. 6, 2013, the disclosure of which is incorporated herein by reference.

DESCRIPTION

The invention relates to an inductive buck-boost-converter and a method for operating the same.

In many applications there is a need to convert voltages upwards and/or downwards by means of a direct current, DC, converter. For up and down conversion, a so-called buck-boost converter is necessary. In a typical example application a converter has to be realized with an input voltage e.g. provided by a battery, the input voltage ranging from 2.5 V to 5.5 V. An output voltage of the converter is to be at 3.3 V. In another example the input voltage ranges from 1.6 V to 3.8 V and the output voltage shall be provided at 3 V. FIG. 7 shows exemplary operating modes of DC converters. It can be seen that as long as the input voltage is much smaller than the output voltage, a step-up conversion is used via a boost converter. If the input voltage is much higher than the output voltage, step-down conversion is applied using a buck-converter. In the range where the input voltage is similar to the output voltage shown as a hatched area in FIG. 7, buck-boost conversion is required. The present application focuses on this buck-boost conversion.

In a known implementation a synchronous buck-boost converter operates four switches in three phases. In the first phase, the converter's inductor is charged. In the second phase, charge is transferred from the inductor towards a capacitor connected to the output of the inverter. In the third phase, this output capacitor is charged even further. Thereby, the inductor current decreases. During all three phases the respective switches are each turned fully on or off. Special circuitry components have to be provided to prevent the inductor current from taking on a negative value which reduces efficiency.

It is therefore an objective of the present invention to provide an inductive buck-boost converter with enhanced operation.

The objective is achieved by the subject-matter of the independent patent claims. Embodiments and developments of the invention are defined in the dependent claims.

In one embodiment an inductive buck-boost-converter has an input to which an input voltage is supplied, an output at which an output voltage is provided as a function of the input voltage, an inductor with a first and a second terminal, a first, a second, a third and a fourth switch, and a control unit. The first switch switchably connects the inductor's first terminal to the input. The second switch switchably connects the inductor's first terminal to a ground potential terminal. The third switch switchably connects the inductor's second terminal to the ground potential terminal. The fourth switch switchably connects the inductor's second terminal to the output. The control unit is coupled to respective control inputs of the first, the second, the third and the fourth switch. The converter is operated in three phases by the control unit. Therein in one of these three phases a transistor realizing the fourth switch is driven in its saturation region by the control unit.

The control unit drives first, second, third and fourth switches such that in the first phase the inductor is charged and in the second and third phases charge is transferred from the inductor towards the output. The transistor realizing the fourth switch in the second or third phase is only hardly turned on. It is operated as a diode, so that its impedance or resistance is high compared to the state where this transistor would be fully turned on and low ohmic.

Because of this transistor being driven in its saturation region, only a small current traverses the transistor. Consequently, a current at the inductor's second terminal, also denoted the inductor current, decreases more slowly as in state of the art implementations. Accordingly, the point at which this current decreases to the value zero can be detected more easily. Discharging of the output can be prevented. This results in enhanced efficiency of the inductive buck-boost converter according to the proposed principle.

The inductive buck-boost-converter is implemented in a non-inverting manner. It can be driven using fixed frequencies or a hysteretic regulation.

A phase refers to a duration during which each of the four switches is driven in a defined state, i.e. on or off, i.e. closed or open.

In a refinement in the phase in which the transistor realizing the fourth switch is driven in its saturation region this transistor's gate source voltage approximately equals a sum of its threshold voltage and its overdrive voltage.

Thus, the transistor of the fourth switch operates as diode. It realizes a high impedance.

The overdrive voltage is known in the context of metal oxide semiconductor field effect transistors, MOSFETs. The overdrive voltage is defined as the voltage between a transistor's gate and source terminals in excess of the threshold voltage. The threshold voltage is defined as the minimum voltage required between gate and source terminals to turn the transistor on i.e. allow it to conduct electricity. The overdrive voltage is also known as "excess gate voltage" or "effective voltage". The overdrive voltage amounts to the difference between gate source voltage and threshold voltage of a MOSFET.

Advantageously, the invented inductive buck-boost-converter reduces ripples of the output voltage as by means of barely switching on the transistor of the fourth switch in one of the phases, the level of the output voltage changes more slowly.

In a development in the phase in which the transistor realizing the fourth switch is driven in its saturation region either the output voltage or the input voltage or a reference voltage is applied to a gate terminal of this transistor.

To drive the transistor realizing the fourth switch in its saturation region, either the output voltage or the input voltage or the reference voltage is applied to its gate terminal. Thereby the reference voltage can be any voltage which is different from the voltage of the ground potential terminal.

In a refinement first and fourth switches are each realized by a p-channel metal oxide semiconductor, PMOS, field effect transistor, FET. Second and third switches are each realized by an n-channel MOSFET.

In a preferred implementation enhancement MOSFETs are used.

Turning on of PMOS and NMOS transistors at the same time is prevented.

In a development a duration of each of the three phases is adjusted dependent on at least one of the following:
a duty cycle, predefined on or off times of first, second, third and fourth switches, or a ratio of the output voltage to the input voltage.

This adjustment of phase duration should be realized in accordance with the application in which the inductive buck-boost-converter is used.

The duty cycle is defined by the ratio between the time during which the first switch is on and the duration of the whole period of the three phases.

In a refinement an output capacitor is connected to the output of the converter.

The output capacitor stores the charge which is transferred form the input via the inductor towards the output.

In one embodiment a method for driving an inductive buck-boost-converter comprises the following steps:

providing the inductive buck-boost-converter as described above, during a first phase driving first and third switches in a closed state and second and fourth switches in an open state, during a second phase driving second and fourth switches in a closed and first and third switches in an open state, and during a third phase driving first and fourth switches in a closed state and second and third switches in an open state, wherein the transistor of the fourth switch is driven in its saturation region in the third phase.

In the third phase where first and fourth switches are on or closed, a slope of the inductor current is dependent on the relationship between input voltage, output voltage and an on-resistance realized by third and fourth switches. As the on-resistance of the fourth switch is high, the inductor current's slope decreases more slowly which simplifies localizing a zero crossing point of this slope. Thereby, the driving of the inductive buck-boost-converter is rendered more efficient.

The different steps of the method can be implemented, for example, within the control unit of the inductive buck-boost-converter acting as a gate driver for the four switches.

In a refinement the third phase is executed after the first phase and before the second phase.

In a development a sequence comprising first, second and third phase is cyclically repeated.

BRIEF DESCRIPTION OF THE DRAWING

The text below explains the invention in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

FIG. 1 shows an exemplary embodiment of an inductive buck-boost-converter according to the invented principle, FIG. 2 shows the invented inductive buck-boost-converter in its three phases, FIG. 3 shows signal diagrams for the embodiment of FIG. 1, FIG. 4 shows a course of a current at the second terminal of the inductor of FIG. 1, FIG. 5 shows a course of a voltage at the second terminal of the inductor of FIG. 1.

FIG. 1 shows an exemplary embodiment of an inductive buck-boost-converter according to the invented principle. The converter comprises an input In, an output Out, an inductor L which has a first terminal Lx1 and a second terminal Lx2, a control unit CTL and four switches A, B, C, D. Furthermore, an output capacitor Cout is depicted which is connected to the output Out and to a reference potential terminal 10.

Figure 6:
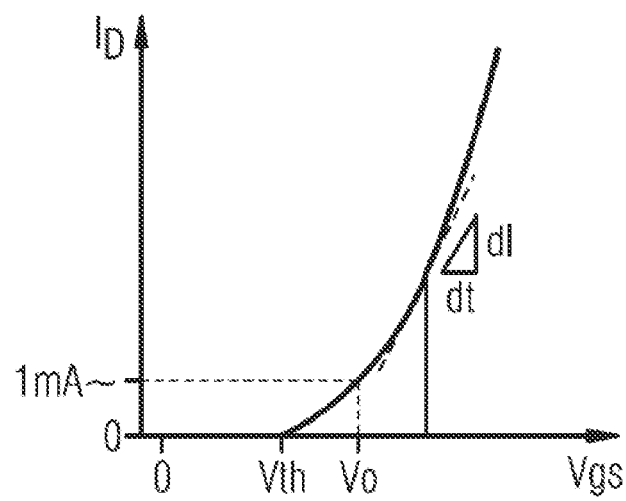
FIG. 6 shows a diagram of the current traversing the transistor of the fourth switch of FIG. 1.
Figure 7:
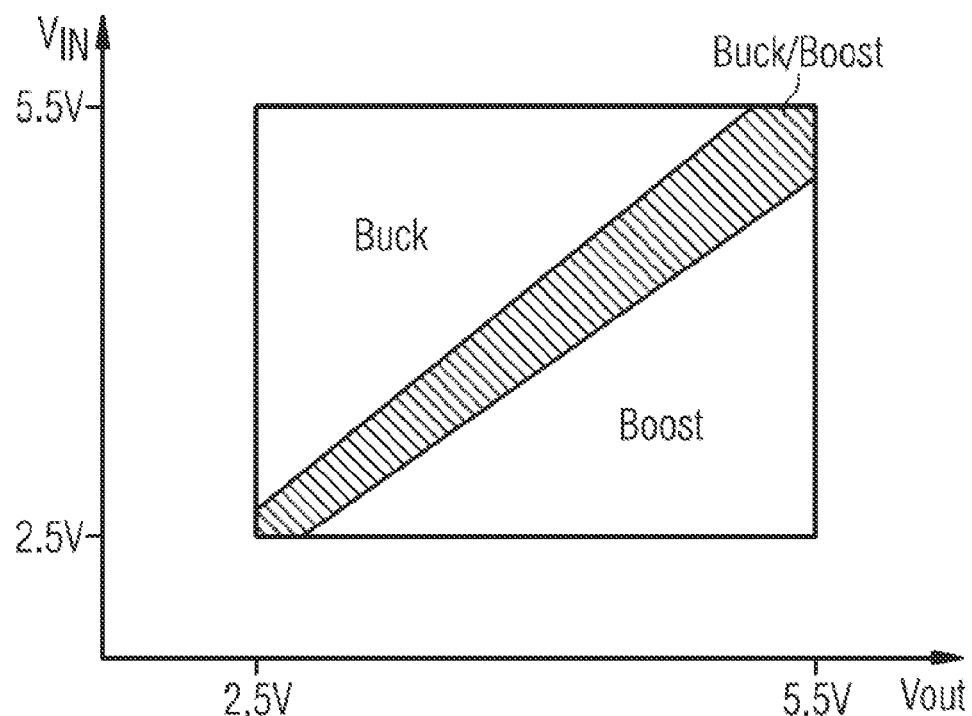
FIG. 7 shows different modes of operation of an inductive converter.

The input In is coupled to the inductor's L first terminal Lx1 by the first switch A. The first terminal Lx1 of inductor L is coupled to the ground potential terminal 10 by the second switch B. The output Out is coupled to a second terminal Lx2 of the inductor L by the fourth switch D. The third switch C couples the inductor's L second terminal Lx2 to the ground potential terminal. The control unit CTL is respectively coupled to control inputs of each of the switches A, B, C and D.

First and fourth switches A, D are each implemented by a PMOS FET. Second and third switches B, C are each implemented as NMOS FETs.

An input voltage Vin is supplied to input In. At the output Out an output voltage Vout is provided as a function of the input voltage Vin.

Operation of the buck-boost converter will be explained below using FIG. 2.

FIG. 2 shows the invented inductive buck-boost-converter in its three phases. For ease of understanding the switches A, B, C and D are drawn as switches instead of transistors.

In the upper part the first phase 1 is depicted. In this phase, first and third switches A, C are closed, whereas second and fourth switches B, D are opened by means of the control unit. The input voltage Vin is applied. Consequently, the inductor L is charged which leads to a rise in inductor current at the second terminal Lx2 of the inductor L.

In the middle part of FIG. 2 the second phase 2 is shown. In this phase the second and fourth switches B and D are closed, whereas the first and the third switches A and C are opened. By this, energy from the inductor L is transferred to the output Out so that the output capacitor Cout is charged. The inductor current at the second terminal Lx2 of the inductor L is decreasing.

In the lower part of FIG. 2 the third phase 3 is depicted. In this phase the second and the third switch B and C are opened, whereas the first switch A is fully on and the fourth switch D is in its saturation region. As in this region only a small current traverses the fourth switch D, it is depicted with a dashed line. In the third phase 3 even more charge is transferred from the inductor L to the output capacitor Cout which leads to a further decrease in inductor current at the second terminal Lx2 of the inductor L.

Due to driving the transistor of switch D in its saturation region, the decrease in inductor current in the third phase 3 at the second terminal Lx2 of inductor L is decelerated. Thereby the location of the exact zero crossing point of this current is simplified. The current is prevented from taking on a negative value which would indicate a discharging of the output capacitor Out. Consequently, the efficiency of the inductive buck-boost-converter is enhanced. Preferably, the third phase 3 is kept relatively short, for example below 10% of the overall duty cycle.

Driving the transistor of the fourth switch D in its saturation region is realized by supplying e.g. the output voltage Vout to its gate terminal as depicted besides the third phase 3. By this, the gate terminal of this transistor becomes connected to its gate terminal. This results in driving this transistor in its saturation region.

In the saturation region, the gate-source voltage of the transistor is higher than its threshold voltage Vth and its drain-source voltage is higher than its overdrive voltage Vo. Consequently, the voltage at the second terminal VLx2 of inductor L which corresponds to the source terminal of the transistor realizing the fourth switch D amounts to the sum of the output voltage Vout, the threshold voltage Vth and the overdrive voltage Vo.

Furthermore, switching from the third phase 3 to the first phase 1 in a cyclic repetition of the sequence only requires turning on the third switch C. This further minimizes the production of switching noises and losses.

In an exemplary sequence, first phase 1 is followed by second phase 2 which is followed by third phase 3 as depicted in FIG. 2. Then this sequence is repeated.

In an alternative sequence, first phase 1 is followed by third phase 3 which is followed by second phase 2. Subsequently this alternative sequence is repeated.

FIG. 3 shows signal diagrams for the embodiment of FIG. 1. Each signal course is depicted with reference to time t. The first four lines show a first, a second, a third and a fourth driving signal SA, SB, SC and SD provided by the control unit of FIG. 1 to corresponding switches A, B, C and D. First, second and third driving signals SA, SB and SC are binary signals with two possible states, high and low. The fourth driving signal SD in the third phase takes on a value of the output voltage Vout, the input voltage Vin or a reference voltage Vref. The fifth line shows the course of the voltage at the first terminal Lx1 of the inductor L, whereas the sixth line shows the course of the voltage at the second terminal Lx2 of the inductor L.

In the first phase 1 switches A and C are closed by first and third driving signals SA, SC. Second and fourth switches are opened by driving signals SB and SC. The input voltage Vin is applied to the first terminal Lx1 of the inductor L. The second terminal Lx2 of the inductor L is at zero volt.

In the second phase 2 the PMOS transistor of the first switch A is turned off by a high state of the first driving signal SA. The NMOS FET of the second switch B is turned on by a high state of the second driving signal SB. The NMOS FET of the third switch C is switched off by a low state of the third driving signal SC. The PMOS FET of the fourth switch D is turned on by a low state of the fourth driving signal SD. Consequently, the voltage at the first terminal Lx1 of the inductor L is at zero Volt, whereas at the inductor's L second terminal Lx2 the output voltage Vout occurs.

In the third phase 3 second and third switches B and C are opened by switching off their transistors with a low state of the first and third driving signal SB and SC. The first switch A is closed by a low state of the first driving signal SA. The transistor realizing the fourth switch D is driven its saturation region by applying the input voltage Vin, the output voltage Vout or the reference voltage Vref via the fourth driving signal SD to its control input.

Therefore, the first terminal Lx1 of the inductor L has the input voltage Vin, whereas the voltage at the second terminal Lx2 of the inductor L rises to a sum of the input voltage Vin and the threshold voltage Vth and an overdrive voltage Vo. If the reference voltage Vref is applied to the gate terminal of switch D, the voltage at the second terminal Lx2 of the inductor L rises to a sum of the reference voltage Vref and the threshold voltage Vth and the overdrive voltage Vo.

FIG. 4 shows the course of an inductor current ILx2 at the second terminal Lx2 of the inductor L, of FIG. 1 with reference to time t. As can be seen, during the first phase 1 the current ILx2 rises as the inductor L is charged via the input In. In the second phase 2, in which charge is transferred from the inductor L to the output capacitor Cout, the current ILx2 drops with a certain rate. In the third phase 3, the current ILx2 decreases even further but at a rate which is smaller than during the second phase 2.

As a result, a point Z where the current crosses the zero line can be detected easily and a negative inductor current at the second terminal Lx2 at the inductor L can be prevented.

FIG. 5 shows a course of a voltage VLx2 at the second terminal Lx2 of the inductor L of FIG. 1 with reference to the time t. During the first phase 1, the voltage VLx2 is at zero. In the second phase 2 the voltage VLx2 reaches the level of the output voltage Vout. During the third phase 3, the voltage VLx2 is pumped to the sum of output voltage Vout and threshold voltage Vth and overdrive voltage Vo.

FIG. 6 shows a diagram of a current I traversing the transistor of the fourth switch D of FIG. 1 in relation to its gate source voltage Vgs. As soon as a gate source voltage Vgs which is greater than the threshold voltage Vth is applied to the PMOS FET of the fourth switch D, a rise in its drain current I occurs. The rate which characterizes the rise in current can be calculated by the term:

$$dI/dt.$$

Therein I represents the drain current I and t represents the time t.

To drive the PMOS FET of the fourth switch D in its saturation region, a gate source voltage Vgs is supplied to its gate which is slightly above the threshold voltage Vth.

The invention is not limited to specific embodiments by the description on the basis of said exemplary embodiments but comprises any combination of elements of different embodiments. Moreover, the invention comprises any combination of claims and any combination of features disclosed by the claims.

REFERENCE LIST 1, 2, 3 phase
10 ground potential terminal
A, B, C, D switch
In input
Out output
L inductor
Cout output capacitor
Vin, Vout, Vref voltage
Vth, Vgs, Vo voltage
LX1, Lx2 terminal
CTL control unit
SA, SB, SC, SD driving signal
t time
Z point

What is claimed is:
1. Method for driving an inductive buck-boost converter comprising the following steps:
    providing an inductive buck-boost converter having
        an input (In) to which an input voltage (Vin) is supplied,
        an output (Out) at which an output voltage (Vout) is provided as a function of the input voltage (Vin),
        an inductor (L) having a first and a second terminal (Lx1, Lx2),
        a first switch (A) which switchably connects the inductor's (L) first terminal (Lx1) to the input (In),
        a second switch (B) which switchably connects the inductor's (L) first terminal (Lx1) to a ground potential terminal (10), a third switch (C) which switchably connects the inductor's (L) second terminal (Lx2) to the ground potential terminal (10), a fourth switch (D) which switchably connects the inductor's (L) second terminal (Lx2) to the output (Out), and a control unit (CTL) coupled to respective control inputs of the first, the second, the third and the fourth switch (A, B, C, D), wherein the converter is operated in three phases (1, 2, 3) by the control unit (CTL), wherein in one of these three phases a transistor realizing the fourth switch (D) is driven in its saturation region by the control unit (CTL), and wherein in the phase in which the transistor realizing the fourth switch (D) is driven in its saturation region this transistor's gate-source voltage (Vgs) approximately equals a sum of its threshold (Vth) voltage and its overdrive voltage (Vo), during the first phase (1) driving the first and the third switch (A, C) in a closed state and the second and the fourth switch (B, D) in an open state, during the second phase (2) driving the second and the fourth switch (B, D) in a closed state and first and third switch (A, C) in an open state, and during the third phase (3) driving the first and the fourth switch (A, D) in a closed state and the second and the third switch (B, C) in an open state, wherein the transistor of the fourth switch (D) is driven in its saturation region in the third phase (3).

2. Method according to claim 1, wherein the third phase (3) is executed after the first phase (1) and before the second phase (2).

3. Method according to claim 1, wherein a sequence comprising the first phase (1), the second phase (2) and the third phase (3) is cyclically repeated.

4. Method according to claim 1, wherein in the phase in which the transistor realizing the fourth switch (D) is driven in its saturation region either the output voltage (Vout) or the input voltage (Vin) or a reference voltage (Vref) is applied to a gate terminal of this transistor.

5. Method according to claim 1, wherein
first and fourth switches (A, D) are realized each by a P-channel metal-oxide-semiconductor, PMos, field-effect transistor, FET, and
second and third switches (B, C) are realized each by an N-channel metal-oxide-semiconductor, NMos, field-effect-transistor, FET.

6. Method according to claim 1, wherein a duration of each of the three phases (1, 2, 3) is adjusted dependent on a duty cycle, or on predefined on or off times of first, second, third and fourth switches (A, B, C, D) or on a ratio of the output voltage (Vout) to the input voltage (Vin).

7. Method according to claim 1, wherein an output capacitor (Cout) is connected to the output (Out).

* * * * *